United States Patent
Luu

(10) Patent No.: US 6,324,690 B1
(45) Date of Patent: *Nov. 27, 2001

(54) INSTALLATION OF APPLICATION SOFTWARE THROUGH A NETWORK FROM A SOURCE COMPUTER SYSTEM ON TO A TARGET COMPUTER SYSTEM

(75) Inventor: Linda Luu, Beaverton, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/127,116

(22) Filed: Jul. 29, 1998

Related U.S. Application Data

(63) Continuation of application No. 08/859,277, filed on May 19, 1997, now Pat. No. 5,860,012, which is a continuation of application No. 08/591,222, filed on Jan. 18, 1996, now abandoned, which is a continuation of application No. 08/130,097, filed on Sep. 30, 1993, now abandoned.

(51) Int. Cl.[7] ........................................ G06F 11/30
(52) U.S. Cl. ............................... 717/11; 709/220
(58) Field of Search ................... 395/712, 701, 395/200.5; 709/220; 717/11

(56) References Cited

U.S. PATENT DOCUMENTS

| | | | |
|---|---|---|---|
| 5,021,949 | 6/1991 | Morten et al. | 364/200 |
| 5,086,502 | 2/1992 | Malcolm | 395/575 |
| 5,247,683 | * 9/1993 | Holmes et al. | 395/700 |
| 5,257,378 | 10/1993 | Sideserf et al. | 395/700 |
| 5,265,239 | 11/1993 | Ardolino | 395/500 |
| 5,361,358 | 11/1994 | Cox et al. | 395/700 |
| 5,386,564 | 1/1995 | Shearer et al. | 395/650 |
| 5,388,211 | 2/1995 | Hornbuckle | 395/200 |
| 5,860,012 | * 1/1999 | Luu | 395/712 |

OTHER PUBLICATIONS

Ofer Wolfgor, "Maintenance of System Software on a Wide Area Network of Mainframes", May 1991, pp 113–119.

Torsten Busse, "WinInstall installs Windows apps from central location", InfoWorld, pp 54 No date.

"WinInstall Sends Applications As E–Mail Attachments", PC Magazine, Jul. 1993, pp 66.

* cited by examiner

Primary Examiner—John A. Follansbee
(74) Attorney, Agent, or Firm—Blakely, Sokoloff, Taylor & Zafman LLP

(57) ABSTRACT

A technique for the remote installation of application software from a source computer system to one or more target computer systems (workstation) coupled to a Local Area Network (LAN). The present invention allows a LAN Administrator to install application software on a user's workstation automatically at any time without user's intervention. The state of (i.e. a snapshot of) the LAN Administrator's system before and after the installation of the application software is captured and an installation package is built. Installation on the user workstations is then scheduled. For installation, the installation package is transmitted to the user workstation where an install program carries out commands in the installation package for installing the application software.

23 Claims, 6 Drawing Sheets

INSTALLATION OF APPLICATION SOFTWARE THROUGH A NETWORK FROM A SOURCE COMPUTER SYSTEM ON TO A TARGET COMPUTER SYSTEM

This application is a continuation of U.S. Pat. application Ser. No. 08/859,277, filed May 19, 1997, now U.S. Pat. No. 5,860,012, which is a continuation of U.S. Pat. application Ser. No. 08/591,222, filed Jan. 18, 1996, now abandoned, which is a continuation of U.S. Pat. application Ser. No. 08/130,097, Sep. 30, 1993, now abandoned.

BACKGROUND OF THE INVENTION

1. Field of the Invention

The present invention relates generally to the field of management of computer systems on a network, and specifically to installation of application software on computer systems through a network.

2. Prior Art

Local Area Networks (LANs) have been developed for interconnecting computer systems for communication amongst computer users, for the exchange of data and for the sharing of resources (e.g. printers, facsimile devices, modems and the like). To properly implement and manage a LAN, a LAN administrator is needed. A LAN Administrator's duties may include such functions as registering users to use the Local Area Network, maintaining the shared resources and monitoring the network load. LANs may also be used to manage the computer systems connected to the network.

With respect to management of the computer systems on the LAN, a desirable function for the LAN administrator is to remotely install application software on systems. Moreover, it would be desirable to perform such installations without the presence of the LAN Administrator. However, known techniques for remote installation of software require the writing of scripts outlining the installation procedures. The writing of scripts is a manual, error prone task which must be performed for each system onto which an application is to be installed.

An improved implementation for remote installation of applications by a LAN administrator is the netOctopus™ program, available from B&L Impuls Software GmbH. netOctopus operates in an Apple® Macintosh networked environment. netOctopus provides for the remote execution of installation scripts on systems in which the application software is to be installed. netOctopus utilizes the installer program that accompanies each Apple Macintosh system. However netOctopus merely allows the LAN Administrator to perform the installation across the network, as if they were sitting at the workstation themselves.

Consequently, it would be desirable to provide a means for automating script generation for remote installation of application software by a LAN Administrator. Further, it would be desirable to provide for such remote installation in a manner that does not require the presence of the LAN Administrator.

SUMMARY

A technique for the remote installation of application software from a source computer system to one or more target computer systems (workstations) coupled to a Local Area Network (LAN) is disclosed. The present invention allows a LAN Administrator to install application software on a user's workstation automatically at any time without user's intervention. The state of (i.e. a snapshot of) the LAN Administrator's system before and after the installation of the application software is captured and an installation package is built. Installation on the user workstations is then scheduled. At that time the installation package is transmitted to the user's workstation where a program carries out commands in the installation package for installing the application software.

The installation package consists of an IPACK format file and the files contained in an application software program. The IPACK format file contains sets of commands that are used to modify system files and perform other functions necessary to the installation of the application software. Further, a personality file may be defined which allows for custom tailoring of the installation on a user's workstation. Further, a UPACK format file provides instructions for deinstalling application software. Deinstallation of application software is necessary for removing unwanted or outdated applications from the user's workstation.

DETAILED DESCRIPTION OF THE PREFERRED EMBODIMENT

A technique for the remote installation of application software on user workstations connected to a Local Area Network (LAN) from a LAN Administrator workstation is described. In the following description, numerous specific details are set forth such as the network topology, in order to provide a thorough understanding of the present invention. It will be apparent, however, to one skilled in the art that the present invention may be practiced without such specific details. In other instances, specific implementation details such as the steps for installation of any particular application software package have not been shown in detail in order not to unnecessarily obscure the present invention.

The currently preferred embodiment of the present invention is implemented for operation in networking environments utilizing the NetWare Network Operating System, available from the Novell Corporation of Provo, Utah. The respective workstations coupled to the network of the currently preferred embodiment would be executing the MS/DOS and the Windows operating system environments, both available from Microsoft Corporation of Seattle, Wash. However, these implementations are not meant to be limiting as to the scope of the present invention. It would be apparent to one skilled in the art to practice the present invention in environments utilizing different network control operating systems and with workstations executing under non MS/DOS or non Windows operating systems.

Further, the following description uses the term "workstation" with respect to any computer system that a user or LAN Administrator may be using. The term "workstation" is not meant to indicate or denote any particular class of computer systems. Finally, the following description will make reference to certain data files and structures, e.g. a CONFIG. SYS file, that are well known to those familiar with the MS/DOS Operating System. Thus, further description of such data files and structures is not deemed necessary.

Overview of a Computer Systems in the Currently Preferred Embodiment

Figure 1:
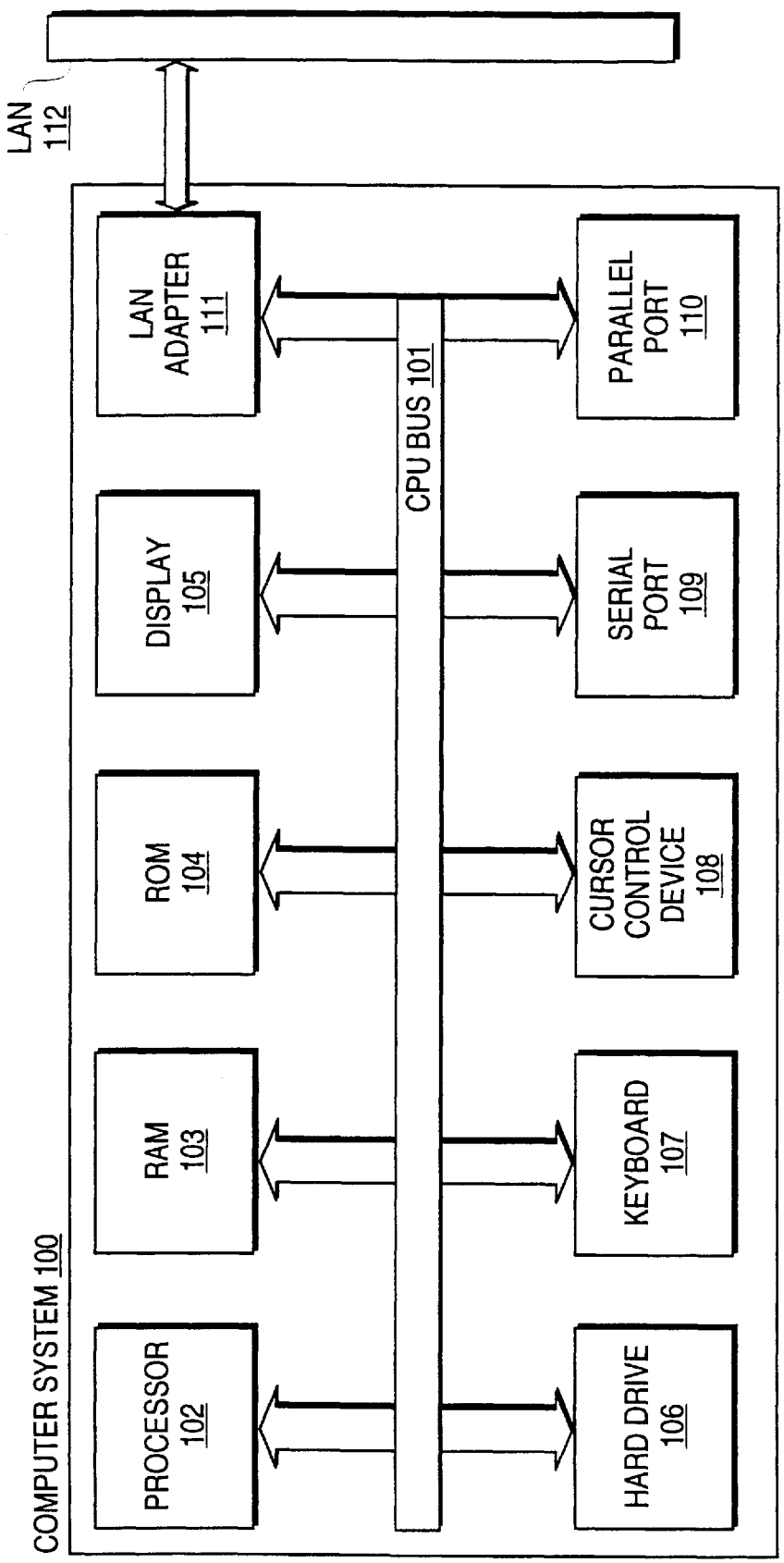
FIG. 1 is a block diagram of a computer system which may be utilized as a LAN administrator workstation or user workstation in the currently preferred embodiment of the present invention.

A computer system embodying a workstation of the currently preferred embodiment is described with reference to FIG. 1. A computer system 100 as may be utilized by the currently preferred embodiment generally comprises a bus structure or other communication means 101 for communicating information between the various components of the computer system, a processor means 102 coupled with said bus 101 for processing information, a random access memory (RAM) or other storage device 103 (commonly referred to as a main memory) coupled with said bus 101 for storing information and instructions for said processor 102, a read only memory (ROM) or other static storage device 104 coupled with said bus 101 for storing static information and instructions for said processor 102, a display monitor 105 coupled with said bus 101 for displaying textual, graphical and image data generated by the computer system, a data storage device 106, such as a magnetic disk and disk drive, coupled with said bus 101 for storing information and instructions, an alphanumeric input device 107 including alphanumeric and other keys coupled to said bus 101 for communicating information and command selections to said processor 102, a cursor control device 108, such as a mouse, trackball, cursor control keys, etc., coupled to said bus 101 for communicating information and command selections to said processor 102 and for controlling cursor movement. Additionally, the system will typically include, one or more ports for receiving input signal data. Such ports are illustrated here as serial port 108 and parallel port 109.

The computer system 101 further includes a Local Area Network (LAN) adapter 111 for attaching to a LAN 112. The LAN Adapter 111 is coupled to CPU bus 101 and is used to transmit/receive information to/from the LAN 112.

It should further be noted that the processor 102 in the computer system would perform various of the processing functions, e.g. generation of the application installation package (LAN Administrator workstation), and actual installation of the application software (user workstation), which is described herein.

LAN Environment

Figure 2:
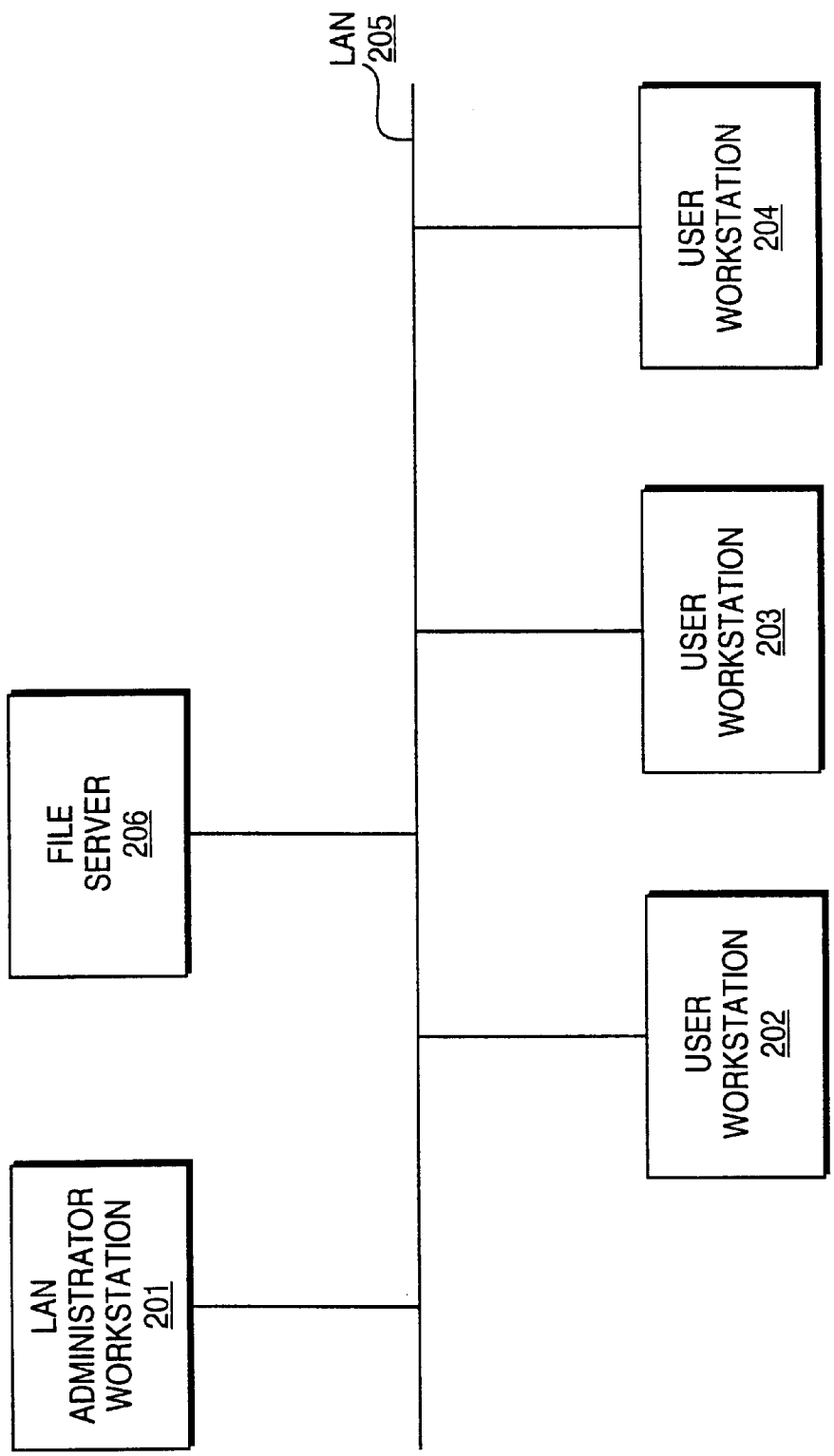
FIG. 2 is block diagram of a LAN with a LAN Administrator workstation and user workstations as may be implemented in the currently preferred embodiment of the present invention.

FIG. 2 illustrates a local area networking environment of the currently preferred embodiment of the present invention. In the currently preferred embodiment, the LAN 205 is an Ethernet LAN. As mentioned above, the network control operating system is Novell NetWare. Referring back to FIG. 2, a LAN Administrator workstation 201 is coupled to the LAN 205. A plurality of user workstations 202–204 are also coupled to the LAN 205. In operation, the LAN Administrator workstation 201 performs various functions in keeping the network and each of the individual user workstations operable. The present invention provides a means by which a LAN administrator can remotely schedule and cause the installation of application software on each of the user workstations 202–204. Without such a facility, the LAN administrator would have to physically install the application software on each of the user workstations 202–204. This is very inefficient since it may require "downtime" of the user workstation during work hours, thus causing a loss in productivity of the user. The alternative, having the application software installed during non-work hours is also undesirable since it still requires the physical presence of the LAN administrator.

Further illustrated in FIG. 2 is file server 206. In many LAN environments various server systems are provided which are shared resources for use and access by the users on the LAN. The file server 206 provides a shared disk storage resource for the LAN Administrator workstation 201 and the User workstations 202–204.

Implementation Architecture of the Currently Preferred Embodiment

In the currently preferred embodiment of the present invention, an installation package is generated at the LAN administrator's workstation that subsequently causes installation of the software on each of the target workstations. Each of the target workstation contains means for receiving the installation package and processing it so that the application software is installed. It should further be noted that the present invention assumes that the Operating System and Operating System levels and other systems files on the LAN administrator workstation and the various user workstations, are the same. If they were not the same, it is clear that the potential for error would be great.

Figure 3:
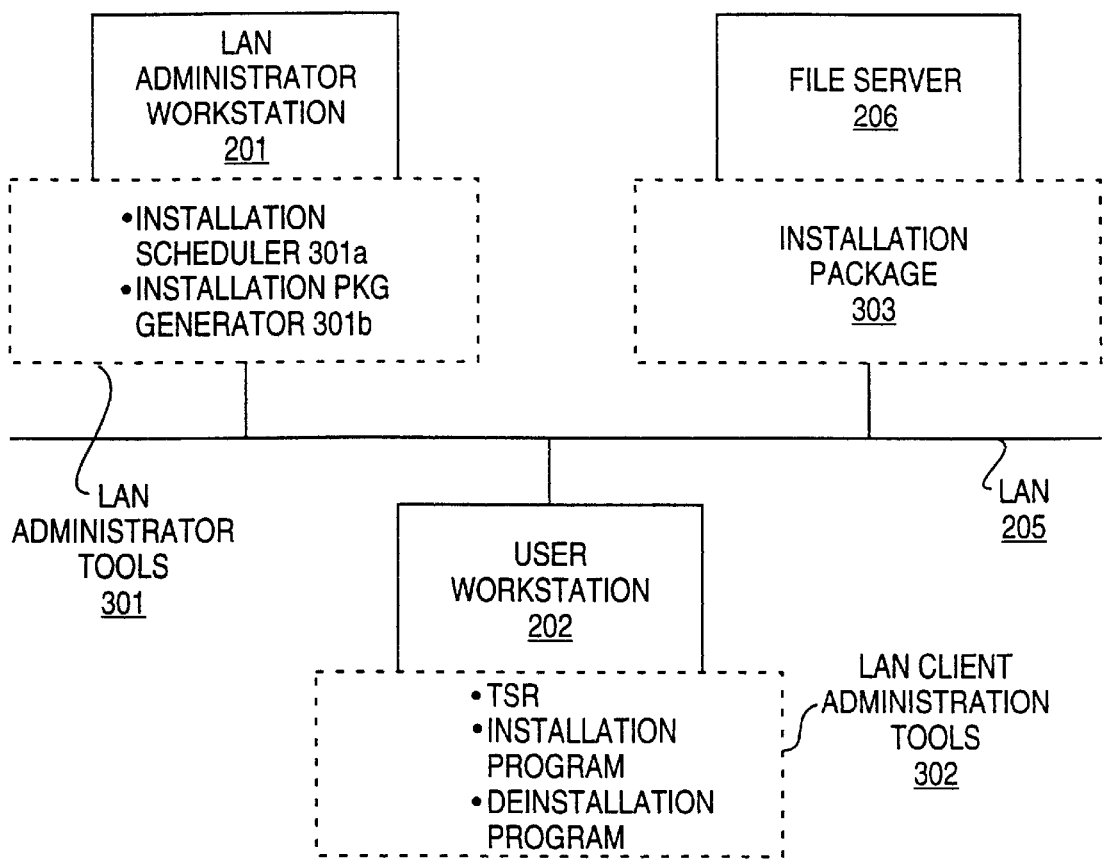
FIG. 3 is a block diagram illustrating the architecture of the main components of the LAN administrator workstation and a user workstation for implementation of the currently preferred embodiment of the present invention.

FIG. 3 illustrates the architecture of the operating software residing on the LAN administrator workstation and the target user workstation in greater detail. Referring to FIG. 3, a LAN administrator workstation 201 contains LAN administrators tools 301. The LAN administrators tools 310 include an installation scheduler 301a and installation package generator 301b. The installation scheduler 301a will allow the LAN administrator to schedule the automated installation of the new application software onto one or more user workstations. It is important to note that the installation scheduler 301a allows the LAN administrator to perform the actual installation at a time when the LAN administrator may or may not be physically present. The installation package generator 301b is used to create the installation package by which the application software is installed. In the currently preferred embodiment, installation package 303 is stored on file server 206.

The target system i.e. the user workstations, contains a set of LAN client administration tools 302. The LAN client administration tools 302 on the target user workstation 202 include a termination and stay resident (TSR) program 302a which remains active in memory on the target workstation. The remote program resident on the LAN Administrator's workstation executes this TSR program and causes an installation program (here installation program 302b) to be invoked. TSR programs of this type are well known to those skilled in the art, so further description of the TSR program is not deemed necessary. The installation program 302b is also part of LAN client administration tools 302. The installation program 302b processes an installation package for installing the application software on the target system. The manner in which this is done will described in greater detail below. Finally, a deinstallation program 302c is provided. The deinstallation program 302c will process a deinstallation package for removing applications from the target system.

Installation Package

The installation package of the currently preferred embodiment of the present invention is generated in what is termed an IPACK format file. The IPACK format file defines various groups of commands which are used by the installation program residing on the user workstation to install the application software. Further, the UPACK format file provides a series of commands for deinstallation of files on a computer system. The IPACK format file is described in greater detail in Appendix A.

In the currently preferred embodiment, the installation package includes the IPACK format file and the application software to be installed. This package is stored on a server system in a compressed format, and it will be later downloaded during the installation process. As is described in Appendix A, the IPACK format file will contain references to the actual physical location of the installation package in compressed format.

Personality File

A second file utilized in the present invention is the personality file. The personality file allows for custom installation of application software on a user workstation. For example, if the application is to be installed in a particular directory, it is specified through the personality file. A custom personality file resides on the user workstation. In operation, the installation program on the user workstation will search for a custom personality file. If no custom personality file is found, a default personality file will be utilized to perform the installation. The personality file format is described in greater detail in appendix B.

The incorporation of a personality file provides a great deal of flexibility for the installation of application software. A custom personality file would typically be created by the LAN Administrator according to the unique requirements of the user.

Remote Installation of Application Software

Figure 4:
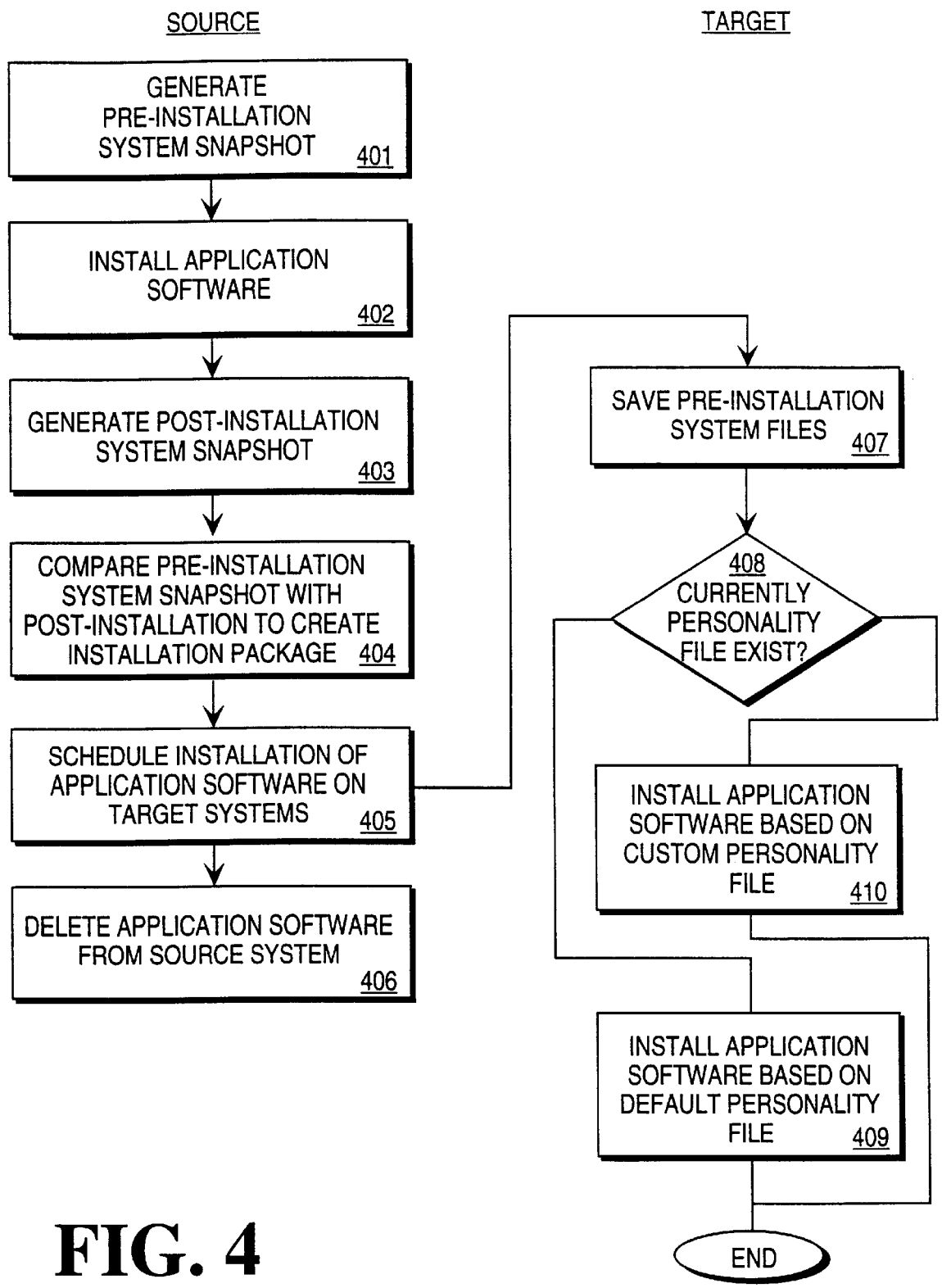
FIG. 4 is a flow chart illustrating the steps performed by the LAN Administrator workstation (source system) and the user workstation (target system) in performing remote application software installations in the currently preferred embodiment of the present invention.

Remote installation of Application Software by the LAN Administrator is a two-step process; generation of an installation package and scheduling the installation at each of the desired user workstations. FIG. 4 is a flowchart which illustrates the steps performed by the LAN administrator workstation and the user workstations. In this description, the LAN administrator workstation will be referred to as the source workstation and the user workstations will be referred to as the target workstations. First, on the source workstation a pre-installation system snapshot is generated and saved, step 401. This pre-installation system snapshot will contain all the information that may be changed as a result of the installation of the application software, such as the complete disk directory structure contents, copies of various system and execution files(e.g. the CONFIG.SYS file and all *.INI and *.BAT files) and other operating system related information. Once the pre-installation system snapshot is stored the application software is installed, step 402. The installation of the application software is performed according to the instructions provided by the particular software application. In the DOS and WINDOWS environment of the currently preferred embodiment, the installation procedures for application software is not standardized. Thus, the present invention has been designed to be general enough to allow for various application installation scenarios. In any event, after the application software has been installed on the source workstation, a post installation system snapshot is generated, step 403. The post installation system snapshot contains the same information as the pre-installation system snapshot except that is taken after the application has been installed.

Figure 5:
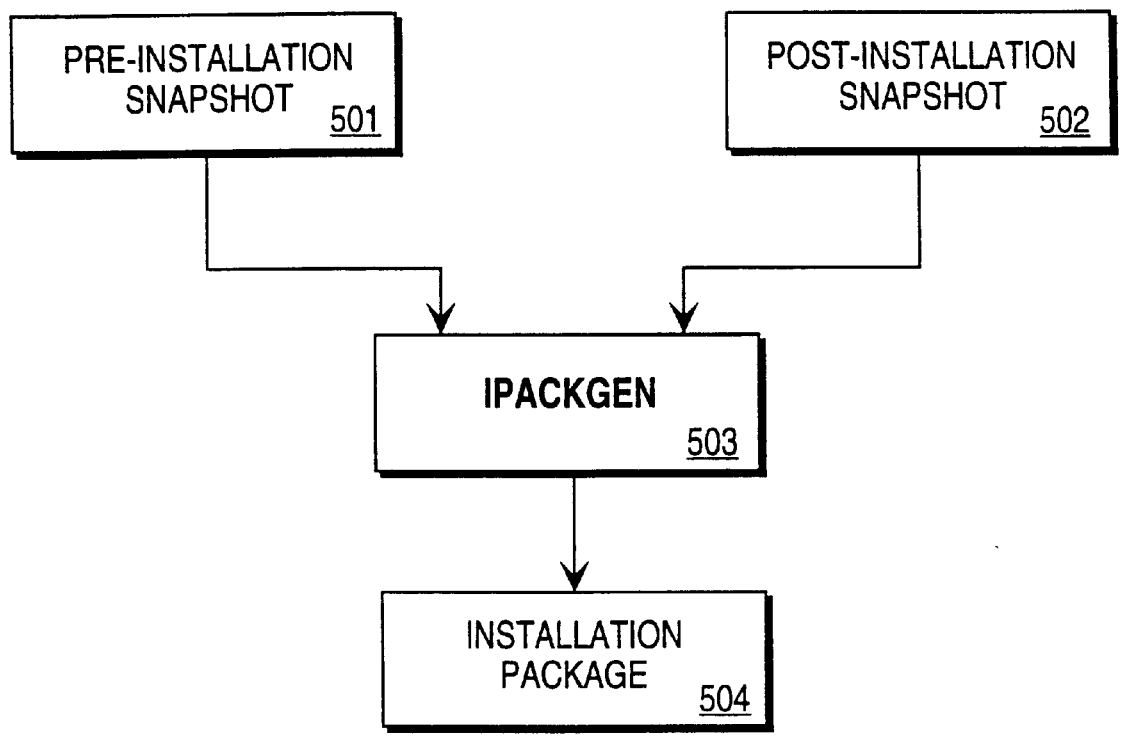
FIG. 5 is a block diagram illustrating the inputs and outputs for generating an installation package on a LAN Administrator workstation as may be performed in the currently preferred embodiment of the present invention.

An installation package is then generated by comparing the pre-installation system snapshot with the post installation snapshot, step 404. As described above, the installation package will include the IPACK format file and the application software. The generation of the installation package is further illustrated in FIG. 5. FIG. 5 is a block diagram which illustrates the inputs and the resultant output for generating an installation package. The program IPACKGEN 503 takes as inputs the pre-installation snapshot 501 and the post installation snapshot 502. As noted previously the pre-installation snapshot contains the state of the system prior to the installation of the application software. The post installation snapshot 502 contains the same information except that it is after the installation of the application software. IPACKGEN 503 then compares the pre-installation snapshot 501 with the post installation snapshot 502 to determine their differences. When comparing the pre-installation snapshot with the post-installation snapshot, the respective disk directory structures, CONFIG.SYS, *.INI, *.BAT and other system related files are compared. The IPACK format file contains instructions to enable modification of the pre-installation snapshot so that it equals the post-installation files. The installation package 504 is then generated based on these differences (refer to Appendix A for the specific commands used and for various examples). In the currently preferred embodiment, the installation package is stored on a server system on the LAN.

Referring back to FIG. 4, once the installation package is created the installation of the application software on each of the respective targets systems is scheduled, step 405. Such scheduling allows the LAN administrator to cause the installation of the application software at off hours, e.g. at night.

It should be noted that in the currently preferred embodiment, the various steps performed by the LAN administrator are done via a dialog and windows type interface. The LAN administrator would respond to prompts from the dialog that has been created for generating installation packages and the scheduling of installations.

The mechanism for causing the transmission of the installation package to a target user workstation utilizes the system clock as a trigger. Such a mechanism for triggering the transmission utilizing the system clock is a well known technique to those skilled in the art. Thus further description of such a technique is not deemed necessary.

Assuming that all installation are successful, the application software may optionally be deleted from the source system, step 406. This is provided for because most application software licenses are based on the number of workstations which may use the software. If the LAN administrator is not going to be using that particular application software they would not want to count that copy of the application software on the LAN administrator systems towards the number being used.

The operation of the target workstation is now described. Referring back to FIG. 4, at a scheduled time, the remote program on the LAN Administrator's workstation executes the TSR. At this point the install software will be invoked on the target workstation and will save the necessary files before the installation takes place, step 407. These files are saved so that in the event of an error, e.g. network failure during transmission of the application software, the application can be readily deinstalled. In any event, the installation software then looks to see whether a custom personality file exists, step 408. If a custom personality file does not exist the application is installed based on the default personality file, step 409 otherwise, the application software is installed based on the custom personality file, step 410. The operations occurring on the target side require no user interaction. The installation package contains the information needed to cause the application software to be installed.

Figure 6:
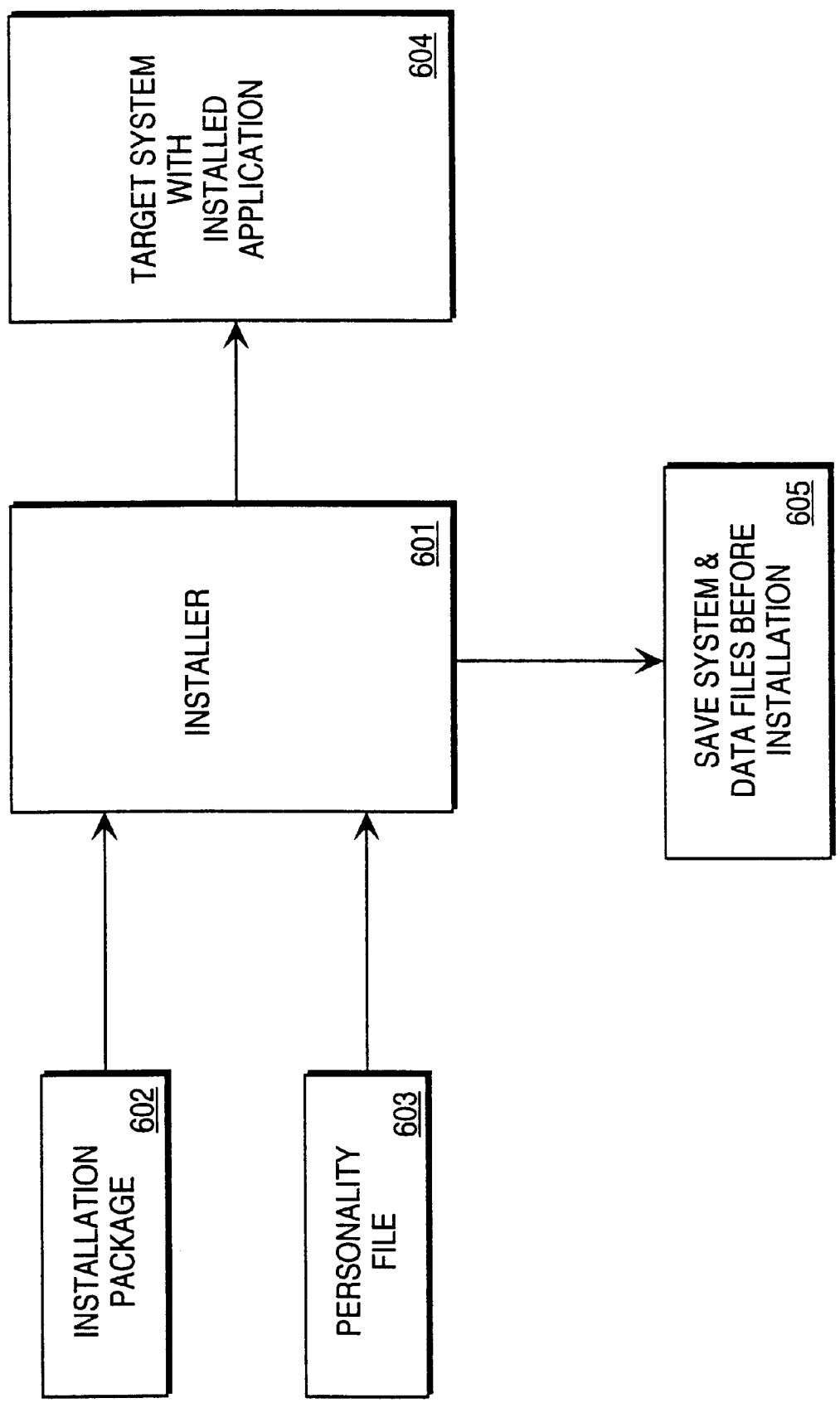
FIG. 6 is a block diagram showing the inputs and outputs for installing an application package on a user workstation as may be performed in the currently preferred embodiment of the present invention.

The installation of the application software on the target workstation is further described with reference to FIG. 6. FIG. 6 is a block diagram which shows the installation of the application software on a target system. An installer (or installation program) 601 receives as input installation packet 602 and a personality file 603. Using these two files as input, an installed application 604 is created on the target system. This is accomplished by carrying out the installation commands set forth by the IPACK format file in accordance with parameters set out by the personality file. As noted previously, the installer 601 also saves the system and data files before the actual installation 605. As noted previously, the installer is initiated by a TSR program that is resident in the target system.

The installation program processes the IPACK format file and determines what files are needed and where they are placed. It then obtains these files from the compressed installation package on the server and places them in the appropriate directories. It also modifies system configuration files based on the directives provided in the IPACK format file. For example in the case of Windows applications, it creates a group (if necessary) and icons as dictated by the application software.

Deinstallation of Application Software

Mechanically, the deinstallation of application software is substantially similar to those for the installation of application software. Here, a UPACK format file for the deinstallation of application software is generated. As a system snapshot has been created on each of the target workstations, prior to installation of the application software, this version of the various files are restored. A UPACK format file can be generally considered as the reverse of an IPACK format file, where added files are deleted. The specific instructions in the UPACK format file are described in Appendix A.

Thus, a method for installation of application software from a LAN Administrator workstation on to a user workstation on a network is described.

-16-

APPENDIX A

DESCRIPTION OF IPACK FORMAT FILE

The IPack Format File

The IPack format file is a text file that is created by a Windows utility program called IPackGen, that executes on your (the LAN administrator's) workstation after an installation package is created. The IPack file's input files are created by a program called Snapshot before the software is installed locally (during the creation of an installation package). These input files contain the following:

- Complete disk directory structure and contents (with file names, date-and-time stamps, file size, and so on)
- Saved copies of CONFIG.SYS, and all *.INI and *.BAT files.
- All Windows Shell (like Program Manager) group names and complete contents.
- Complete Windows Registration Database information.

To build the IPack format file, the IPackGen program compares the input files gathered by the Snapshot program with the similar information gathered by IPackGen after the software is installed. Using the differences, IPackGen creates the IPack format file.

LANInstall may also create a UPack, or Uninstall file for removing installations that have been made previously by LANInstall.

Appendix A – The IPack Format File

General Format

The IPack Format file consists of 11 groups, presented in no particular order. Each group is denoted by a name enclosed in double square brackets. Some of these groups may be empty and are listed below in alphabetical order:

[[AddedFiles]]

[[AddedRegDB]]

[[BasePersonality]]

[[Configuration]]

[[DeletedFiles]]

[[DeletedRegDB]]

[[MergedPersonality]]

[[ModifiedTextFiles]]

[[ModifiedWinShell]]

[[OtherErrorsAndWarnings]]

[[ReplacedFiles]]

*note icon*    Although the names are given in mixed case, both case and leading whitespace are ignored. (For example,"    [[ADDEDFiles]]" is acceptable.) However, all characters inside the brackets are significant, and must match exactly.

Any line whose first character is a semi-colon (";") is considered a comment and is ignored. Commented lines are copied (for example, from IPack to Log, from Personality to IPack, from Log to UPack), with the following exceptions:

- All comments are removed from [[OtherErrorsAndWarnings]], [[AddedFiles]], [[DeletedFiles]], and [[ReplacedFiles]] groups.

- Comments in [[AddedRegDB]] are copied into [[DeletedRegDB]] (and vice-versa) when UPGen creates an uninstall IPack Format file (for instance, a FilterUPack or LogUPack file).

Appendix A The IPack Format File

- Comments in the [[MergedPersonality]] group (which is created by merging the Base Personality with a workstation Personality) will contain only those comments from the file that is being overwritten (for instance, acting as "base")..
  That is:
    - Comments in the [InstallFlags], [UninstallFlags], or [FileTransferFlags] section will be copied only from the Base Personality (since the workstation Personality "Flags" sections always overwrites the Base Personality "Flags" sections).
    - Comments in the [PathMacros] section will be copied only from whichever Personality's [PathMacros] section is overwritten (as determined by the BaseMacrosOverwrite flag).

IPack Format File Groups

The next several sections explain the groups that make up the IPack format file.

[[AddedFiles]], [[DeletedFiles]], [[ReplacedFiles]]

The [[AddedFiles]], [[DeletedFiles]], and [[ReplacedFiles]] groups contain lists of directories and filenames. The format consists of a full directory path, followed by filenames within that directory. Sometimes a group may be empty. Additional sets of directories and filenames can be given as needed.

Following is a sample [[AddedFiles]] group:

[[AddedFiles]]
$(WINDOWS)\W4W
    DECOMP.EXE
    SETUP.EXE
    .
    .
    .
$(WINDOWS)\W4W\CLIPART
    BOOKS.WMF ~~Appendix A~~ The IPack Format File

```
CAPITOL.WMF
      .
      .
      .
$(WINDOWS)
    WINWORD.INI
```

Entries in the [[ReplacedFiles]] group are only valid within a Log file (see Appendix C for further discussion). Entries in this group are ignored during an installation. The IPackGen utility always places added and replaced files in the [[AddedFiles]] group. The Administrator's Log file tells whether a file was added or replaced during the initial installation that is part of creating an installation package.

IPackGen creates these groups in the IPack Format and Log files by comparing the data on all files and directories that are scanned before and after the initial installation. Any file or directory that changed (added, deleted, or replaced) is included in the appropriate group. The only exceptions to this are:

- The temporary working directory created by Snapshot (which is removed by IPackGen) is never included, nor are any files within that directory.

- No files that have both hidden and system attributes are included.

- Windows *.GRP files are not included (except for .GRP files that get added without a corresponding Windows Shell group).

During the installation, a check of the time and date stamps ensures that an existing file is replaced only if the added file is newer than the existing file. If it is not, an entry in the log file notes that the file was *not* replaced (unless the two files are identical). A Personality file flag, OverwriteNewerFiles, can be set to True to disable the time and date check, which forces the added file to be copied.

The [[DeletedFiles]] group is always processed first during an installation, followed by the [[AddedFiles]] group. Although unlikely, if a file appears in both lists, the existing file is deleted (if there is one) and the new file is added.

[[AddedFiles]]

During an installation, if a directory listed in the [[AddedFiles]] group does not exist, it is created.

In one type of IPack Format file, a FilterUPack, a "\*" may appear after a directory name. A FilterUpack file is sometimes part of the deinstallation process. for more information, see "Uninstall IPack Files" in appendix D. The trailing \* indicates that all files listed under this directory in the LogUPack file being filtered are acceptable and may be added.

[[DeletedFiles]]

In the [[DeletedFiles]] group, a directory name followed by a list of filenames indicates that the listed files are to be deleted and that the directory (and any unnamed files) will remain. If no filenames are specified, no action will occur.

A directory name ending with \* indicates that the directory and all of its files will be deleted. (This includes all sub-directories and *their* files.) Any filenames following the directory name are ignored.

A directory name ending with \? indicates that the directory will be deleted only if it is empty after deleting all the other files and sub-directories listed in the [[DeletedFiles]] group.

[[AddedRegDB]] and [[DeletedRegDB]]

The [[AddedRegDB]] and [[DeletedRegDB]] groups are non-empty only for installations of Windows programs that modify the Registration Database. If one or both of these groups contain entries, the Windows macro must be defined (see Appendix B for details).

[[AddedRegDB]]

Entries in the [[AddedRegDB]] group have the following form:

*key=value*

*key* refers to the name of the key as stored in the Registration Database. It is similar to a directory path, but does not begin with the root indicator (\).

*value* is the string to the right of the equal sign, and may consist of any characters.

For example:

Appendix A : IPack Format File

```
regedit\shell\open\command=regedit.exe %1
```

During an installation, keys listed in this group are added to the workstation's Registration Database if they do not already exist. If the key already exists, but has a different value than the value specified, the value is changed to the specified value. However, an existing value is *not* be replaced with a null value. (A null value is given by an entry of the form "key=", that is, no value is specified to the right of the equal sign.)

[[DeletedRegDB]]

Entries in the [[DeletedRegDB]] group have the following form:

*key*

Only *key* names are listed, since the value is not considered when deleting a key. (The Log file *does* contain the value, however, as described in Appendix C).

The keys given in this group are deleted, as are sub-keys branching from each specified key. For example, assume the Registration Database at a particular workstation contains the following keys:

key0
key0\key1
key0\key1\key2
key0\key1\key2\key3
key0\key1\keyTwo
key1

If key0\key1 is listed in the [[DeleteRegDB]] group, the following keys are deleted:

key0\key1
key0\key1\key2
key0\key1\key2\key3
key0\key1\keyTwo

[[BasePersonality]]

The [[BasePersonality]] group usually contains a copy of the default Base Personality file present on the LAN admin's workstation during the creation of the IPack format file.

*note icon*    *If the personality file specified in Parmfile.ss is not the default personality file on the administrator's workstation, the file copied is the one specified in the file Parmfile.ss.*

Appendix A The IPack Format File

The [PathMacros] section is copied as read. Rather than copying all of the flags sections in the personality file, only the appropriate flags sections get copied (For a file transfer, this would be the [FileTransferFlags] section. The [UninstallFlags] section is copied also.)

During installation, this information is used only if a search of the workstation's Personality file fails to find a required path or flag entry. For more information on these entries, refer to Appendix B, *Personality Files*.

The only time the [[BasePersonality]] group contains information other than that read from the base Personality file is during the deinstallation process, within a UPack, LogUPack, FilterUPack, or a Log file. In these cases, the group's information still represents the base (default) Personality. However, the information is derived from sources other than the base Personality file. This is necessary to properly "undo" an installation where the Personality file has changed since the installation was performed.

[[Configuration]]

This [[Configuration]] group is always required to be non-empty and contains entries that pertain to the configuration of the package being installed. These entries are explained as follows:

ExcludePath=*Path*

The ExcludePath= entry specifies a path to a directory that contains files to be excluded from the installation. It must be created by hand because it is never created by the IPackGen utility. If the ExcludeFiles flag in a workstation's Personality file is set to True, no files from the specified directory are copied, nor is the directory created. (This also includes creation or modification of text files given in the [[ModifiedTextFiles]] group.) All directories that branch from the specified directory are also skipped.

The ExcludePath= entry may be given more than once if it is necessary to specify more than one directory path.

IPackDataFile=*Path\Filename*

Appendix A   IPack Format File

The IPackDataFile= entry specifies the complete path and filename of the compressed "archival" file that contains copies of all files that must be copied during installation of the software package. This entry is created by IPackGen.

For more information, see Appendix C, *Log Files*.

IPackFileType=*Type*

The IPackFileType= entry identifies the type of the IPack Format file and is created by IPackGen (or DPackGen or UPGen, as appropriate). The IPackFileType= enty must contain one of the following values:

IPack      An an installation IPack Format file.

DPack      A file transfer (distribution) IPack Format file.

UPack      A "merged" de-installation IPack Format file, created by merging a FilterUPack and LogUPack file.

FilterUPack
     A file used to filter entries in a LogUPack file during the deinstallation process. "Filter" means to modify an event or prevent it from happening. FilterUPack is created from an IPack file during the deinstallation process.

LogUPack      A UPack Format file created from a Log file during the deinstallation process.

Log      A log file (created during installation, deinstallation, or file transfer).

Error      One or more errors were encountered during generation of this file.

ErrorFatal
     A fatal error was encountered, forcing processing to terminate prior to completion.

RequirementsFile=*Path\Filename*

The RequirementsFile= entry specifies the complete path and filename of the file that contains the hardware and software requirements for the software package being installed. IPackGen creates the RequirementsFile= entry by copying the corresponding entry given in the Parmfile.li file.

~~Appendix A  The IPac... ormat File~~

[[MergedPersonality]]

The [[MergedPersonality]] group contains a copy of the Personality file that was used during creation of this IPack Format file. It contains the macros and flags that resulted from the merging of the base Personality and the LAN Administrator's Personality.

This information is used by DPackZip, and by UPackGen when processing an IPack Format file directly (not a Log file). For more information, refer to Appenidx B, *Personality Files*.

[[ModifiedTextFiles]]

The [[ModifiedTextFiles]] group uses a script language to detail the changes that must be made to specific text files during the installation process. Text files that may be modified include *.BAT, CONFIG.SYS, *.INI, and possibly other files as determined by the creator of the IPack Format file (such files will be given a file type of INI).

*note icon*   *Changes made to the "Order=" entry in the [Settings] section of the"PROGMAN.INI" file , as well as to the entire [Groups] section, should never be given in this group. Such changes must be made by using the appropriate commands available in the [[ModifiedWinShell]] group detailed later in this appendix.*

The [[ModifiedTextFiles]] group is created by IPackGen when it encounters a text file that has been added or changed. A deleted text file, however, is not entered in this group (instead, it appears in the [[DeletedFiles]] group). This does not prevent the deletion of a text file from occurring in this group. For example, a text file that was created during a LANInstall installation is "uninstalled" by a series of Remove commands. If the text file is empty after processing all the commands, it is deleted.

Notation Conventions and Rules

The following notation conventions pertain to the commands that may be included in the [[ModifiedTextFiles]] group:

Appendix A - IPack Format File

- Text in *italics* denotes a replaceable parameter. It must be replaced with suitable information (see below). Bold text is used to denote keywords (like commands).
- Replaceable parameters shown in braces (like "{*Where*}") are optional.
- The OR character (|) between two elements indicates "one or the other, but not both."
- All text is case insensitive.
- Leading whitespace is ignored in most instances. However, whitespace is necessary to delimit tokens, except where a distinct delimiter exists (like a bracket ([)).
- A line may contain up to 510 characters. A command cannot continue on to the next line. A line whose first non-whitespace character is a semicolon is considered a comment and is ignored.
- If a command matches more than one line within a file (or within a section, if dealing with sections), the first line matched will be the line acted upon.

Replaceable Parameters

*FindText*
   Locates a line in the original file by combining 1 or more {*Text*} search strings. For example, ({rem} {device} {mouse.sys}) will locate a line containing all three strings (in the order given).

*FindText* must be surrounded by parentheses. Consider the following example:

Append ({path}{=}) {$(WINDOWS)\ACCESS}

The search for a matching line containing *FindText* always begins at the top of the original_file (or section, if a section is being modified). *FindText* locates the first matching line in the.original file that remains unmodified in the new (working) file. In other words, if a line containing *FindText* is found, but that line has been Delete'd, Rem'd, or Unrem'd in the working file, the line will not be used, and the a search for the next matching line begins.

Appendix A The IPac ormat File

A line will match *FindText* only if the *FindText* strings occur in the line in the same order as given in *FindText*. For example, {key}{=} requires that the equal sign character occurs after the matched "key" string.

*FindText* matches are performed in the same manner as a search for a line to be added (see *Add matches* later in this chapter). Enough *FindText* must be given for at least a partial match; more information can be given to ensure an exact match. For example, given an AUTOEXEC.BAT file containing:

set var1 = i:

the *FindText*:

({set}{var1})

will match with the AUTOEXEC.BAT line. A more specific *FindText*, such as:

({set}{var1}{C:})

will not match this line, since C: represents the value portion of the line, and the existing line has a value of j:, not C:.

In order to match comment lines, the proper comment character(s) must be given as the first *FindText* item; comment lines will not match *FindText* that does not include the comment path = c:\dos;c\windows The *FindText* ({path}{=}) only matches the second line, not the first.

*Path/Filename*
A full path, including drive letter and colon, followed by a filename (including extension, if any). May include one or more path macros (for example
$(DOSDRIVE)\FILE.EXT).

*Section*
For files containing sections (like .INI files), [*Section*] must be specified in the first command following a File command; it is optional in subsequent commands applying to the same section. If the section doesn't exist in the original file, all commands except Add and Append will log an error and skip the command. Add and Append will create a new section if [*Section*] does not exist.

Appendix A. Pack-Format File

If the [Section] specified is commented out, the comment character(s) must appear as the first character of [Section] (for example, ;[fonts]).

Comment lines at the beginning of an .INI file, before any [Section], are referenced by using the special "null section" notation: "[]" (no characters between the open and close brackets).

The search for a matching section always begins at the top of the original file. Except for Add and Append, the matching section must also exist in the current file (the one being modified). If the section is in the original file, only a Delete command will remove it from the current file (or Remove, if the RemoveIsDelete flag is True).

*Text*
A complete or partial statement within a text file (like SYSTEM.INI, AUTOEXEC.BAT, and so on). It may include replaceable parameters, like $(DOSDRIVE), anywhere within the string.

*Text* must always be enclosed within braces. For example,

{This is a Text string.}

If *Text* contains braces, they must properly matched. The following is invalid:

{This is an open-brace: "{" but there is no matching end-brace.}

*Where*
*Where* identifies the position in the text file the specified line is to be added. If *Where* is not given, the line will be added after the previously processed line. If no line has been processed yet in the file being modified, the line will be added to the end of the file. *Where* is not applicable to Windows .INI files, since they are not order-dependent. Additions made to these files are always made at the end of the current section (and sections will always be added to the end of the file being modified).

*Where* is replaced by one of the following commands:

After *FindText*   The line below the first line matching *FindText*.

Before *FindText*   The line above the first line matching *FindText*.

Appendix A The IPack Format File

| | |
|---|---|
| End | The last line of the file. |
| Next | The line after the previous line just processed (default if *Where* is not specified). |
| Start | The first line of the file. |

As currently implemented, Next's "line just processed" includes a line processed by *any* command, not just Add. This means that if lines are being added to the end of a file, and then a line is Rem'd, the next line will be added after the Rem'd line (unless a *Where* clause is given).

$(*MacroName*)
A macro name to be replaced with a path during the actual installation (based on the macro's value in the Personality file on the workstation where the installation is taking place).

[[ModifiedTextFiles]] Commands

This section details the commands used in the [[ModifiedTextFiles]] group.

File *Path\Filename*

The File command denotes that any following commands are to be applied to the specified file. This command is required, and must appear as the first statement for each file to be modified. *Filename* must be CONFIG.SYS, *.BAT, or *.INI. Any other filename will be processed as if it is an .INI file, which may lead to errors.

The following commands appear after a File command, and apply to the specified file:

Add {[*Section*]} {*Where*} *Text*
This command adds the new line *Text* to the current file being modified. Add must be replaced by one of the following:

| | |
|---|---|
| Add! | Adds the new line even if an identical line already exists in the current file. |
| Add+ | Adds the new line as long as an identical line does not already exist. |

Appendix A - The IPack Format File

| | |
|---|---|
| Add | Adds the new line if no similar line exists, otherwise the existing line will be Remove'd ("translating" to either Delete or Remout) and the new line added. |
| Add? | Adds the new line only if no similar line exists. |

Three of the four forms of the Add command add a new line without disturbing existing lines. The fourth form, "Add " may add a new line, or replace an existing line. When searching for an existing similar line, the entire original file is searched (before changes). Just as with *FindText* searches, only matching lines that are unmodified in the new (working) file are used. If a *Where* clause designating a specific location is given (before or after a specific line), then only that specific line will be examined for a match with the line being added—the entire file will not be searched. (This ensures that the line is added where specified, regardless of whether the line is new, or it replaces an existing line.) If one of the other *Where* clause locations is given (end, next, or start), the entire file is searched. In this case, the *Where* location will be used only if the line is new.

For a description of matching "identical" and "similar" line, see "Add matches" later in this chapter.

Add creates a new section if *Section* does not already exist. An empty section is be created if only "Add [*Section*]" is given (and *Text* is not given). (However, even the command "Add! [section]" will not add [*Section*] if it already exists.)

This command has the opposite effect of the Delete command (that is, a Delete command in an Install Log file will be translated to a corresponding Add command for inclusion in a UPack format file).

Append {[*Section*]} *FindText Text*
Appends *Text* to the end of the first statement found that matches *FindText* within the current file (or section). The first character of *Text* is assumed to be the delimiter between items being appended. The installation routine ensures that two consecutive delimiters are not placed together. For example, consider the following command line:

```
Append ({path}) {;c:\windows;d:\windows\winword}
```

Appendix A The UPack ormat File

If the file being modified has a path statement ending with a semicolon, the first semicolon in the Append command line will not be added.

Multiple items may be appended by including them within *Text*, separated by the append delimiter. If an item already exists in the line matching *FindText*, it will not be appended. (The comparison for an existing item is case insensitive.) The following example appends only `calendar.exe` to the line `load=clock.exe calc.exe cardfile.exe`:

Append ({load}) {calendar.exe CALC.EXE Cardfile.exe}

If the AppendAndExtractSaveOriginal flag in the Personality file is set to True, a commented-out copy of the original (unmodified) line is Add'd to the file being modified.

If no line matching *FindText* is found, a line created from the Append command line is added to the end of the file (or section). The line is created by concatenating the *FindText* elements, each separated by a space, followed by an equal sign character, and *Text* (without the first [delimiter] character). Consider the following example:

Append ({set}{temp}) {;$(WINDEV)}

It creates the following line if no line containing "set" and "temp" is found:

set temp=$(WINDEV)

Although the line was added, it appears in the Log file as an Append operation.

This command is used as the opposite of the Extract command (that is, an Extract command in an Install Log file will be translated to a corresponding Append command for inclusion in a UPack format file).

Delete {[*Section*]{? | *}} *FindText*
The Delete command deletes the first line encountered containing *FindText* within the file (or section). The original file's contents will be searched (as opposed to the current file after modifications).

If [*Section*] is not given but the file being modified contains sections, the last *Section* specified will be searched. (If a *Section* has not yet been specified for this file, no delete will occur.)

~~Appendix A 1.~~ .Pack Format File

A '*' given after [Section] name (without FindText) specifies that the entire section be deleted, including all entries within that section.

A '?' given after [Section] specifies that the section be deleted only if it is empty (i.e., contains no entries, including comments, but not blank lines). If it is followed by FindText, then the specified line will be deleted before the check for an empty section is made.

Delete [Section] (without a '?', '*', or FindText) is invalid and will be ignored.

Extract {[Section]} FindText Text
Removes Text from the first statement found matching FindText within the current file (or section). The Extract operation fails if a statement matching FindText is not found.

The first character of Text must be the "append delimiter" between items being extracted. Multiple items may be extracted by including them within Text, separated by the "append delimiter." The comparison for an existing item is case insensitive. Consider the following example:

Extract ({load}) { calendar.exe CALC.EXE Cardfile.exe}

It extracts cardfile.exe and calc.exe from the following line:

load=clock.exe calc.exe cardfile.exe

If the AppendAndExtractSaveOriginal flag in the Personality file is set to True, a commented-out copy of the original (unmodified) line will be Add'd to the file being modified.

The Extract command is used as the opposite of the Append command (that is, an Append command in an Install Log file will be translated to a corresponding Extract command for inclusion in a UPack format file). The Extract command allows text that was previously added using Append to be removed from within the same line, no matter where it currently is within that line.

**Remout {[Section]{? | *}} FindText**
Creates a remark from the first line encountered containing FindText within the file (or section). (If the line is already commented out, no action will occur.) Remarks are preceded by "rem" unless the file is an .INI file, in which case a semicolon appears.

Appendix A  The IPa... Format File

If [Section] is not given, but the file being modified contains sections, the last Section specified is searched. (If a Section has not yet been specified for this file, no action will occur.)

A '*' given after [Section] name (without FindText) specifies that the entire section be commented out, including all entries within that section.

A '?' given after [Section] specifies that the section heading (name) be commented out, if the section is empty (commented and blank lines are not considered in determining whether the section is empty or not).

Remout [Section] (without a '?', '*', or FindText) comments out the section heading only.

Remout is used as the opposite of the Unrem command.

**Remove {[Section]{? | *}} FindText**
The Remove command removes the specified line by acting as either a Delete or Remout command. By default, Remove acts as a Remout command, commenting out the first line encountered containing FindText within the file (or section). If the line is already commented out, no action will occurs. The original file's contents will be searched, as opposed to the current file after modifications. However, if the RemoveIsDelete flag in the Personality file is set to True, then Remove will actually Delete the specified line.

If [Section] is not given but the file being modified contains sections, the last Section specified is searched for a FindText match. If a Section has not yet been specified for this file, no remove occurs.

A '*' given after [Section] name (without FindText) specifies that the entire section will be removed, including all entries within that section.

A '?' given after [Section] specifies that the section be removed only if it is empty (contains no non-blank entries, or comments if the RemoveIsDelete flag is True). If it is followed by FindText, then the specified line will be removed before the check for an empty section is made.

~~Appendix A 1.~~ IPack Format File

Remove never appears in the Log file; it is always changed to Delete or Remout, depending on which action really occurred. Defining Remove this way allows the LAN Administrator to select a default action for Remove and yet manually override specific instances by editing the IPack Format file. For example, if the RemoveIsDelete flag is set to False, but you know that the command Remove *{Files=40}* can safely delete the line "Files=40", you can change the command to Delete.)

Remove is used as the opposite of the Add command (that is, an Add command in an Install Log file will be translated to a corresponding Remove command for inclusion in a UPack format file). Since Remove itself never appears in a Log file, it has no opposite command.

Unrem {*[Section]*}{*} *FindText*
Removes a remark from the first line encountered containing *FindText* within the file (or section). The remark characters removed will be "rem" unless the file is an .INI file, in which case ";" will be removed. As mentioned in the *FindText* discussion in "Replaceable Parameters" earlier in this appendix, the remark character(s) must be given as the first *FindText* item in order to find the line to Unrem.

If the specified *[Section]* refers to a section heading (name) that is commented out in the original file, the comment character(s) must be given as the first character (for example, in an .INI file ; [Colors]).

If *[Section]* is not given but the file being modified contains sections, the last *Section* specified will be searched. If a *Section* has not yet been specified for this file, no action occurs.

A '*' given after *[Section]* name (without *FindText*) specifies that the entire section be uncommented, including all entries within that section.

Unrem *[Section]* (without a '*' or *FindText*), uncomments the section heading only.

Unrem is used as the opposite of the Remout command

[[ModifiedTextFiles]] Examples

Appendix A—The IPack Format File

Consider the following [[ModifiedTextFiles]] section of an IPack format file:

```
[[ModifiedTextFiles]]
FILE $(DOS)\AUTOEXEC.BAT
APPEND ({path}{=}) {$(WINDOWS)\ACCESS}
ADD NEXT {SET INIT=$(WINDOWS)\ACCESS}
ADD NEXT {SET TEMP=$(WINDOWS)\ACCESS\TEMP}
FILE $(WINDOWS)\SYSTEM.INI
ADD [386Enh] {device=*vmcpd}
REMOVE ({device}{=}{vmcpd})
```

The preceding commands would make the following changes to the AUTOEXEC.BAT file found in the $(DOS) directory.:

- The Append command adds the base path to the end of the current "path" variable found in AUTOEXEC.BAT. If the flag AppendAndExtractSaveOriginal in the Personality file is set to True, a commented-out copy of the original path= statement is added.

- The line {SET INIT=$(WINDOWS)\ACCESS} is added after the path= statement. If a set init= statement already exists in this position within the file, it is Remove'd. If the flag RemoveIsDelete in the Personality file is set to False (or is not defined), then a Remout of the current set init= statement is performed, otherwise a Delete occurs.

- The line SET TEMP= $(WINDOWS)\ACCESS\TEMP} is added after the set init= statement. A Remove of an existing similar line occurs as just described.

- The line device=*vmcpd is added to the end of the [386Enh] section of SYSTEM.INI. If a line containing device= and vmcpd already exists in this section, it is Remove'd.

- The Remove command operates on the "current" section ({386Enh}). It affects the original device=*vmcpd statement, not the one added by the preceding command. If the flag RemoveIsDelete in the Personality file is set to True, the specified statement is deleted. If the RemoveIsDelete flag is set to False, a Remout of the statement occurs. This command is redundant because the existing similar line would have been Remove'd during the Add command described earlier.

Appendix A    Ipack Format File

Assume CONFIG.SYS is being modified, and it contains the following line:

DEVICE=$(WINDOWS)\HIMEM.SYS

The following statement:

ADD {device=$(DOS)\HIMEM.SYS}

Replaces the line:

DEVICE=$(WINDOWS)\HIMEM.SYS with:

device=$(DOS)\HIMEM.SYS after making the appropriate substitutions of $(WINDOWS) and $(DOS). The Log file will show[1]:

Delete {DEVICE=$(WINDOWS)\HIMEM.SYS}

Add {device=$(DOS)\HIMEM.SYS}

This example assumes that the flag RemoveIsDelete in the Personality file is set to True (if not, the Delete would be a Remout), and illustrates that an Add command performs a Remove on an existing line (if there is one). The example also assumes that paths are used in determining a match (see Add matches, later in this appendix). If they are not, then no change is made, since the root program name in the line to be added is the same as that of the existing line.

Here is another example:

Add [fonts]

Add {Small Fonts (VGA res)=SMALLE.FON}

The sequence adds the following line to the end of the [fonts] section in the current file:

Small Fonts (VGA res)=SMALLE.FON

If a section named [fonts] does not already exist, it is created. "Add [fonts]" is written to the Log file as "Add [fonts] +" if the section was created.

*Add* matches

---

[1]The actual macro name used in the Add statement log may be different from that given in the Ipack Format, since it depends upon the workstation's Personality file.

Appendix A The IPac... ormat File

The Add command searches the "original" copy of the current text file being modified for a line that matches the line being added, in order to determine what action to perform (replace the current matching line or just add the new line). It searches for a match in the original copy, and then references the matching line's corresponding line in the "working" copy.)

The range of lines that may be searched is limited as follows:

- If a *Where* clause designating a specific location is given (before or after a specific line), then only that specific line is examined for a match with the line being added

- If a *Where* clause is not given and the file contains sections, only the current section is searched.

- If a *Where* clause is not given and the file does not contain sections, all lines in the entire file are searched.

A match is either "identical" (also, "exact") or "similar" (also, "partial"). Whether a match is identical or similar is determined by the type of file being modified (CONFIG.SYS, *.BAT, or *.INI), as well as the specific line being added. Different line types have been defined, grouping together lines with similar characteristics. A line is composed of several elements; a specific line type has some or all of these elements. The exact meaning of the element may also depend upon the specific line type (or even the specific line).

The possible elements of a line are:

keyword
> The keyword might be the command in a *.BAT file (for example, "ECHO"), or the key in an *.INI file (for example, "speed" in the line speed=medium).

key modifier
> An additional piece of information required to make the keyword unique. Both the keyword and key modifier (when present) must be identical for a line to match. The key modifier is not applicable to *.INI files.

path
> If a specified path is necessary to further qualify a line, it is stored in "path" (as opposed to being part of "value"). For example, the command call *path\progname* uses *path* as a unique part of the statement. *Path* is not applicable to *.INI files, which always use "value".

Appendix A-1. IPack Format File value
The remainder of the line, after the other elements have been identified. For example, "medium" in the *.INI line speed=medium, or /e:1000 ./p in the CONFIG.SYS command shell=D:\msdos\command.com /e:1000 /p.

The different line types, the elements they include, and an example of each type are summarized in the following table.

| Line Type Name | Keyword | Key Modifier | Path | Value | Example |
|---|---|---|---|---|---|
| Blank | | | | | Blank lines: always exact matches |
| BatStd | | Partial | Exact | Exact | C:\Windows\smartdrv C 2048 |
| CfgDevice | Exact | Partial | Exact | Exact | Device=C:\DOS\setver.exe C: |
| IniStd | Partial | | | Exact | speed=medium |
| KeyAndKeyMod | Partial | Partial | | Exact | SET VAR1 = 2000 |
| KeyAndProdName | Partial | Partial | Exact | Exact | Call D:\bats\dos_path DOS_MSC |
| KeyAndValue | Partial | | | Exact | Echo This is a test |

Partial — Indicates that the element must match between the lines being compared in order for the lines to be considered at least "partial" matches.

Exact — Indicates that the element must match in order for the lines to be considered "exact" matches.

The following table shows how to determine the line type of a line based on the type of file the line is in, and the key word found in the line. It also lists the default Add command that IPackGen generates (for example, Add! is generated when adding a blank line).

| File Type | Keyword | Line Type | Add Type |
|---|---|---|---|
| All files | <none> | Blank | ! |
| CONFIG.SYS | Device | CfgDevice | |
| | Devicehigh | CfgDevice | |
| | Drivparm | KeyAndKeyMod | |
| | Install | KeyAndProgName | |
| | Shell | KeyAndProgName | |

Appendix A The IP Format File

|  | | <all others> | KeyAndValue | |
|---|---|---|---|---|
| *.BAT files | | Break | KeyAndValue | |
| | | Call | KeyAndProgName | |
| | | Cls | KeyAndValue | ! |
| | | Command | BatStd | ? |
| | | Echo | KeyAndValue | ! |
| | | Emm386 | BatStd | ? |
| | | Fastopen | BatStd | ? |
| | | Lastdrive | KeyAndValue | |
| | | Goto | KeyAndValue | ! |
| | | If | KeyAndValue | ! |
| | | Loadhigh | KeyAndProgName | |
| | | Lh | KeyAndProgName | |
| | | Mirror | BatStd | ? |
| | | Path | KeyAndValue | |
| | | Pause | KeyAndValue | ! |
| | | Set | KeyAndKeyMod | |
| | | Share | BatStd | |
| | | Shift | KeyAndValue | ! |
| | | Verify | KeyAndValue | |
| | | <all others> | BatStd | + |
| *.BAT files | | Device | KeyAndProgName | |
| | | <all others> | IniStd | |

The "@" character (as the first non-whitespace character of a *.BAT line) is not considered significant when searching for matching lines. For example, the line "echo Hello!" being added with the command:

Add{echo Hello!} will match exactly with the following line in a *.BAT file:

@echo Hello!

Comment lines only match other, identical comment lines. For example, the line "files = 50" with the command:

Add{files = 50}

Appendix A-1  Pack Format File will not even partially match with the following line in a CONFIG.SYS file:

rem files=50

The lines "rem files = 50" and "rem files=40" do not even partially match.

[[ModifiedWinShell]]

The [[ModifiedWinShell]] group will be non-empty only for installations of Windows programs that modify the Shell's group information. This group is one of the last two groups to be processed, after all other files have been copied and modified as needed.

Notation Conventions and Rules

The following notation conventions pertain to the commands that may be included in the [[ModifiedWinShell]] group:

- Text in braces ("{----}") is optional.

- Text in *italics* is replaced with suitable information (see below). Bold is used to denote keywords (like commands).

- All text is case insensitive.

- Leading whitespace between tokens (keywords) is ignored.

- A Command can not continue on to the next line. A command may contain up to 510 characters. A line whose first non-whitespace character is ";" is considered a comment and is ignored.

[[ModifiedWinShell]] Commands

The [[ModifiedWinShell]] commands modify group files. Quotation marks must be used to delimit string arguments that contain spaces, commas, or parentheses. The syntax and command names were adapted from the Windows' Shell-DDE interface.

AddItem(CmdLine,Name{,IConPath{,IconIndex{,XPos{,YPos{,DefDir{,HotKey{,fMinimize}}}}}}})

Appendix A The IPa ...ormat File

Adds an item (i.e., icon) to the currently active group. If an item already exists with the same *Name*, the existing item will be replaced by this item.

*CmdLine*
    A string that specifies the full command line required to start the application. It can be the full path of an executable file along with parameters required by the application. It can also be an associated file name. The association is taken from the registration database.

*Name*
    A string that specifies the item title to be displayed below the icon in the group window.

*IconPath*
    A string that identifies the filename for the icon to be displayed in the group window. It can be either a Windows executable file or an icon file. If this parameter is not specified, Windows will attempt to use the *CmdLine* parameter. If *CmdLine* specifies neither an executable file nor an associated executable file, Windows will use a default icon.

*IconIndex*
    An integer that specifies the index of the icon in the file identified by the *IconPath* parameter.

*XPos,YPos*
    The *xPos* and *yPos* integers specify the horizontal and vertical positions of the icon in the group window. If these values are given as "-1", or no arguments are specified after *IconIndex*, the icon will be added in the next available position in the group window.

*DefDir*
    A string that specifies the name of the default (or working) directory.

*HotKey*
    A decimal integer that identifies a hot (or shortcut) key sequence specified for the application.

*fMinimize*
    A Boolean flag (0 or 1) that specifies whether an application window should be minimized when it is first displayed.

CreateGroup(*GroupName*)

Appendix A-1    Pack Format File

Creates a new group, or activates the window of an existing group. If the group exists, this command is written to the Log file as ShowGroup instead of CreateGroup. (CreateGroup appears in the log file only if the group was actually created.)

*GroupName*
    A string that identifies the group to be created or activated.

DeleteGroup(*GroupName*){?}

Deletes an existing group, including all the items (icons) within the group. However, if a '?' is given after the closing parenthesis, the group is deleted only if it is empty at the time the command is processed.

*GroupName* A string that identifies the group to be deleted.

DeleteItem(*ItemName*)

Deletes the first item in the currently active group found with the name of *ItemName*. If deletions are the only actions to be made from the currently active group, activate DeleteItem it is with ShowGroup rather than CreateGroup (see ShowGroup later in this appendix).

*ItemName*
    A string that specifies the item to be deleted from the currently active group.

ReplaceItem(*ItemName*)

Deletes the first item in the currently active group found with the name of *ItemName*, and remembers the position of this item (icon). The next command should be an AddItem command, which will be placed in the same position as the item just deleted, regardless of the AddItem's *XPos* and *YPos* positions (if any are given).

*ItemName*
    A string that specifies the item to be replaced in the currently active group.

ShowGroup(*GroupName*)

Appendix A The IPax ormat File

The ShowGroup command activates the specified group window. Unlike CreateGroup, the specified window is not created if it does not exist. ShowGroup should be used in place of CreateGroup when only deletions are being made from a group (to prevent creation of an empty window).

Appendix A — Pack Format File

[[ModifiedWinShell]] Example

Here is an example of the [ModifiedWinShell] group that creates a new group "Windows Applications", and adds a new program item (i.e., icon) "Win App" to this group.

```
[[ModifiedWinShell]]
CreateGroup("Windows Applications")
AddItem(winapp.exe,"Win App",winapp.exe,2)
```

[[OtherErrorsAndWarnings]]

The [[OtherErrorsAndWarnings]] group contains error and warning messages that do not directly relate to any other group.

-17-

APPENDIX B

DESCRIPTION OF PERSONALITY FILE

The Personality File

A LANInstall Personality file is a text file containing workstation-specific information that allows an installation to be customized for a particular workstation. On any given workstation, this Personality file is optional. A base, or default, Personality file is included in the IPack format file. For more information on this default file, see the [[BasePersonality]] group description in Appendix A.

A Personality file contains path macros and customization flags that are described in this chapter. If a workstation's Personality file does not contain a particular macro or flag, the value in the IPack format file's [[BasePersonality]] group is used. If the same entry is in both the workstation's Personality file and the [[BasePersonality]] group, the value of the BasePersonalityOverwrites flag determines which entry is used. For normal operation, this flag should be set to FALSE in the [InstallFlags] and [FileTransferFlags] sections of the Personality file, and TRUE in the [UninstallFlags] section.

Appendix B The Personality File

[PathMacros]

Specified path macros replace absolute paths, which allows you to customize installation parameters for individual workstations. They are defined in the Personality file section named [PathMacros], and have the form MacroName=path. Consider the following example:

```
[PathMacros]
UTILS=F:\UTILS
DOS = d:\msdos

WINDRIVE=G:
Windows=$(WINDRIVE)\windows
BOOTDIR=C:\
```

Case is ignored, but non-leading whitespace is significant. The Macro name on the left side of the equal sign must contain the same whitespace as found in the macro reference. For example, $(WindowsDir) matches WindowsDir, but not Windows Dir).

Path macros are entirely user-defined and are not created by LANInstall. Macro names may be anything you like, but there must be a macro named Windows defined if the installation involves a Windows program. The Windows macro must expand to the complete path of the directory in which Windows is installed. For example, Windows=$(WINDRIVE)\windows.

After final macro expansion, directory paths must be *full*, that is, they must always begin with a root directory, usually preceded by a drive letter and colon. As an example, say the Personality file contains the following line:

```
WINUTIL=J:\WINDOWS\UTILS
```

Now say that the (absolute) path of the installed package is:

```
J:\WINDOWS\UTILS\PBS
```

The resulting "macro-based" path would be:

```
$(WINUTIL)\PBS
```

If the macro-based path is set to an absolute path (such as J:\WINDOWS\UTIL\PBS), the software is installed in the same, absolute location on all workstations and warning message is written to the Log file.

Appendix B The Personality File

A valid path does not end with a "\", except when referring to the root directory (like BOOTDIR=C:\) Then it is absolutely essential. If such a macro is defined without the "\" character, it refers to the specified drive, not the drive's root directory.

When possible, you should avoid defining multiple macros for the same path. For example, assume the Base Personality has a path macro defined as Util = C:\util. A workstation's Personality has Util and another (say, UtilPath) set to the same path. After an installation, the workstation's installation Log file may show UtilPath as the macro used, rather than Util. This is not likely to cause problems, but it certainly could cause confusion.

[FileTransferFlags], [InstallFlags], [Uninstall Flags]

The [FileTransferFlags], [InstallFlags], and [UninstallFlags] sections of the Personality file contain Boolean flag values that can be included to personalize the procedure being performed (file transfer, installation, or uninstallation) for the workstation containing the Personality file. The following values are all acceptable (case is ignored):

```
True   False
T      F
Yes    No
Y      N
1      0
```

Default values are always False if the entry is not present, or a value is not given. Although the following flag names are shown in mixed case, case is not significant. Some flags may not be applicable to all sections. For example, AppendAndExtractSaveOriginal is ignored if it appears in the [FileTransferFlags] section.

AppendAndExtractSaveOriginal=*Bool*

If True, the Append and Extract commands of the [[ModifiedTextFiles]] group create (Add) a commented-out copy of the original line (before modification).

BackupOldVersion=*Bool*

If True, an archival copy containing all files that appear (uncommented) in the Log's [[DeletedFiles]] and [[ReplacedFiles]] groups is created, using the path and filename specified in the iPackDataPath parameter of the PARMFILE.LI file.

BaseMacrosOverwrite=*Bool*

Appendix B The Personality File

If True, a macro in the [[BasePersonality]] group in the IPack format file takes precedence over the same macro in an individual workstation's Personality file. By default, if this entry is not present, the workstation's Personality file overwrites duplicate macros in the [[BasePersonality]] group.

For install and file transfer operations, this flag should normally be set to False. For an uninstall, this flag should normally be set to True. This ensures that the macros used are the macros that were in effect during the installation of the package that is being uninstalled. Set the BaseMacrosOverwrite flag to False for an uninstall when it is necessary to use the current definitions of the macros, rather than their old values.

DisableInstall=*Bool*

If True, this workstation refuses installations.

DisableModifiedTextFilesBAK=*Bool*

If this flag is False, and a file in the [[ModifiedTextFiles]] group is changed, the original file is renamed with a .BK extension. If this flag is set to True, the original file is overwritten by the changed file and no backup is made.

ExcludeFiles=*Bool*

If True, the directory or directories specified in all ExcludePath entries in the IPack format file's [[Configuration]] group are not created, nor are any files in those directories copied.

LogAllWarnings=*Bool*

If True, low-priority (nuisance) warnings are logged. By default, only high-priority warnings are logged (and all errors).

OverwriteNewerFiles=*Bool*

Appendix B The Pe~~r~~ lity File

If True, files in the [[AddedFiles]] group are always copied, even if a file with a newer time/date stamp already exists on that workstation. If False, files is copied only if there is no newer existing file.

RemoveIsDelete=*Bool*

If True, the Remove command in the [[ModifiedTextFiles]] group of the IPack format file executes. If set to False, a Remout occurs. For more information, see "[[ModifiedTextFiles]]" in Appendix A.

I claim:

1. A computer-implemented method for generating an application installation package to install an application software package across a network on one or more target workstations from a source workstation, said computer-implemented method comprising:

creating a pre-installation system snapshot of the software on said source workstation;

installing said application software package on said source workstation;

creating a post-installation system snapshot of the software on said source workstation;

generating an application installation package for said application software package on said source workstation based on differences between said pre-installation system snapshot and said post-installation system snapshot; and said target workstation receiving said application installation package and a default personality file from said source workstation, said default personality file describing default installation parameters for said application software package and said target workstation, said target workstation installing said application software package based on said application installation package and said default personality file.

2. The computer-implemented method as recited in claim 1 wherein installing said application software package based on said installation package and said personality file further includes executing instructions from said application installation file including an instruction for modifying systems files in said target workstation according to said application installation file.

3. The computer-implemented method as recited in claim 1 further including scheduling a predetermined time for the installation of said application software on said target workstation.

4. The computer-implemented method as recited in claim 1 further including deinstalling said application software package from said source workstation.

5. The computer-implemented method as recited in claim 1 further comprising specifying custom installation parameters.

6. The computer-implemented method as recited in claim 5 wherein installing said application software package based on said installation package further comprises installing said application software based on said custom installation parameters.

7. The computer system for generating an application installation package to install an application software package on one or more target workstations, said computer system comprising:

means for creating a pre-installation system snapshot of the software on said computer system;

means for installing said application software package on said computer system;

means for creating a post-installation system snapshot of the software on said computer system;

means for generating a personality file for said one or more target workstations, said personality file describing installation parameters for said application software package and said one or more target workstations, said installation parameters representing requirements of users of said one or more target workstations; and means for generating an application installation package from said pre-installation system snapshot, said post-installation system snapshot, and said application software package, said application installation package comprising a plurality of commands for installing said application software package on said one or more workstations.

8. The system as recited in claim 7 further comprising means for generating a personality file for said one or more target workstations, said personality file describing installation parameters for said application software package and said one or more target workstations, said installation parameters representing requirements of users of said one or more target workstations.

9. The system as recited in claim 8 further comprising means for installing said application software package based on said application installation package and said personality file.

10. A computer system for generating an application installation package to install an application software package on one or more target workstations, said computer system comprising:

a program for creating a pre-installation system of snapshot software on said computer system prior to installation of said application software package;

said program also for creating a post-installation system snapshot of said software on said computer system after said installation of said application software package;

means for generating a personality file for said one or more target workstations, said personality file describing installation parameters for said application software package and said one or more target workstations, said installation parameters representing requirements of users of said one more target workstations; and said program for generating an application installation package from said pre-installation system snapshot, said post-installation system snapshot, and said application software package, said application installation package comprising a plurality of commands for installing said application software package on said one or more target workstations.

11. The system as recited in claim 10 further comprising means for generating a personality file for said one or more target workstations, said personality file describing installation parameters for said application software package and said one or more target workstations, said installation parameters representing requirements of users of said one or more target workstations.

12. The system as recited in claim 11 further comprising means for installing said application software package based on said application installation package and said personality file.

13. A machine readable medium having stored thereon data representing sequences of instructions, which when executed by a computer system, cause said computer system to perform operations comprising:

creating a pre-installation system snapshot of software on said computer system prior to installation of an application software package;

creating a post-installation system snapshot of said software on said computer system after said installation of said application software package;

generating a personality file for said one or more target workstations, said personality file describing installation parameters for said application software package and said one or more target workstations, said installation parameters representing requirements of users of said one or more target workstation; and generating an application installation package from said pre-installation system snapshot, said post-installation system snapshot, and said application software package, said application installation package comprising a plurality of command for installing said application software package on one or more target workstations.

14. A system comprising:

a source workstation to create a pre-installation system snapshot of software on the source workstation, to install an application software package on the source workstation, to create a post-installation system snapshot of the software on the source workstation, and to generate an application installation package for the application software package on the source workstation based on differences between the pre-installation system snapshot and the post-installation system snapshot; and a target workstation to receive the application installation package and a default personality file from the source workstation, the default personality file describing default installation parameters for the application software package and the target workstation, and to install the application software package based on the application installation package and the default personality file.

15. The system as recited in claim 14 wherein the target workstation is to execute instructions from the application installation file including an instruction to modify systems files in the target workstation according to the application installation file.

16. The system as recited in claim 14 wherein the source workstation is to schedule a predetermined time for installation of the application software package on the target workstation.

17. The system as recited in claim 14 wherein the target workstation is to deinstall the application software package from the source workstation.

18. The system as recited in claim 14 wherein the target workstation is to specify custom installation parameters.

19. The system as recited in claim 18 wherein the target workstation is to install the application software based on the custom installation parameters.

20. A machine readable medium that provides instructions, which when executed on a processor, cause the processor to perform operations comprising:

creating a pre-installation system snapshot of software on a source workstation;

installing the application software package on the source workstation;

creating a post-installation system snapshot of the software on the source workstation;

generating an application installation package for the application software package on the source workstation based on differences between the pre-installation system snapshot and the post-installation system snapshot; and target workstation receiving the application installation package and a default personality file from the source workstation, the default personality file describing default installation parameters for the application software package and the target workstation, the target workstation installing the application software package based on the application installation package and the default personality file.

21. A method of generating an application installation package to install an application software package on one or more target workstations, the method comprising:

creating a pre-installation system snapshot of the software on a source workstation;

installing said application software package on the source workstation;

creating a post-installation system snapshot of the software on the source workstation;

generating a personality file for said one or more target workstations, said personality file describing installation parameters for said application software package and said one or more target workstations, said installation parameters representing requirements of users of said one or more target workstation; and generating an application installation package from the pre-installation system snapshot, the post-installation system snapshot, and the application software package, the application installation package comprising a plurality of commands for installing the application software package on the one or more target workstations.

22. The method as recited in claim 21 further comprising generating a personality file for the one or more target workstations, the personality file describing installation parameters for the application software package and the one or more target workstations, the installation parameters representing requirements of users of the one or more target workstations.

23. The method as recited in claim 22 further comprising installing the application software package based on the application installation package and the personality file.

* * * * *

UNITED STATES PATENT AND TRADEMARK OFFICE
CERTIFICATE OF CORRECTION

PATENT NO. : 6,324,690 B1
DATED : November 27, 2001
INVENTOR(S) : Luu

It is certified that error appears in the above-identified patent and that said Letters Patent is hereby corrected as shown below:

Column 5,
Line 33, delete "UPACK", insert -- IPACK --.

Signed and Sealed this

Twenty-fifth Day of February, 2003

JAMES E. ROGAN
*Director of the United States Patent and Trademark Office*